United States Patent [19]
Zumbe

[11] Patent Number: 5,882,709
[45] Date of Patent: Mar. 16, 1999

[54] PROCESS FOR MANUFACTURE OF REDUCED FAT AND REDUCED CALORIE CHOCOLATE

[75] Inventor: Albert Zumbe, Coventry, United Kingdom

[73] Assignee: Cadbury Schweppes plc, London, United Kingdom

[21] Appl. No.: 633,778

[22] PCT Filed: Oct. 17, 1994

[86] PCT No.: PCT/GB94/02265

§ 371 Date: Jul. 9, 1996

§ 102(e) Date: Jul. 9, 1996

[87] PCT Pub. No.: WO95/10946

PCT Pub. Date: Apr. 27, 1995

[30] Foreign Application Priority Data

Oct. 20, 1993 [GB] United Kingdom ............... 9321606

[51] Int. Cl.⁶ .................................................. A23G 17/00
[52] U.S. Cl. ...................... 426/481; 426/631; 426/660
[58] Field of Search ................................. 426/660, 593, 426/453, 479, 481, 631

[56] References Cited

U.S. PATENT DOCUMENTS

| | | |
|---|---|---|
| 2,336,346 | 12/1943 | Carver . |
| 3,184,315 | 5/1965 | Wolf ........................................ 426/660 |
| 3,671,267 | 6/1972 | Gooding ................................. 426/633 |
| 3,903,311 | 9/1975 | Billerbeck .............................. 426/633 |
| 3,966,997 | 6/1976 | Warkenten ............................. 426/660 |
| 4,000,322 | 12/1976 | Billerbeck .............................. 426/633 |
| 4,017,645 | 4/1977 | Ziccarelli ................................ 426/660 |
| 4,081,568 | 3/1978 | Bracco .................................... 426/660 |
| 4,191,786 | 3/1980 | Nappen .................................. 426/893 |
| 4,219,584 | 8/1980 | Mori ....................................... 426/607 |
| 4,268,527 | 5/1981 | Matsuo ................................... 426/607 |
| 4,276,322 | 6/1981 | Padley .................................... 426/607 |
| 4,283,436 | 8/1981 | Soeters ................................... 426/607 |
| 4,861,607 | 8/1989 | Margolis ................................. 426/481 |
| 4,873,109 | 10/1989 | Tanaka ................................... 426/607 |
| 4,877,636 | 10/1989 | Koyano .................................. 426/607 |
| 4,910,037 | 3/1990 | Saji ......................................... 426/607 |
| 5,051,265 | 9/1991 | Meister .................................. 426/660 |
| 5,079,027 | 1/1992 | Wong ..................................... 426/633 |
| 5,200,220 | 4/1993 | Capodieci .............................. 426/660 |
| 5,215,771 | 6/1993 | Caldebaut .............................. 426/660 |
| 5,252,349 | 10/1993 | Carter .................................... 426/479 |
| 5,342,644 | 8/1994 | Cain ....................................... 426/660 |
| 5,360,621 | 11/1994 | Mentink ................................. 426/660 |
| 5,403,601 | 4/1995 | Kamai .................................... 426/633 |
| 5,439,695 | 8/1995 | Mackey ................................. 426/660 |
| 5,464,649 | 11/1995 | St. John ................................. 426/660 |
| 5,591,476 | 1/1997 | Capodieci .............................. 426/660 |

FOREIGN PATENT DOCUMENTS

| | | |
|---|---|---|
| 6 740 | 4/1969 | France . |
| 4-53447 | 2/1992 | Japan ..................................... 426/607 |
| 2142340 | 1/1985 | United Kingdom ................... 426/607 |

OTHER PUBLICATIONS

Desrosier 1977 Elements of Food Technology AVI Publishing Co., Inc., Westport CT pp. 580–587.

Potter 1973 Food Science, second edition AVI Publishing Co. Inc, Westport CT pp. 558–562.

Minifie 1980 Chocolate, coca and confectionery: science and technology, second edition AVI Publishing Co., Inc, Westport CT pp. 67–88, 39–58, 105–126.

Giddey 1961 Polymorphism in Coca Butter Rev. Int. Choc. 10 pp 548–554.

Database WPI, week 8645, Derwent Publications Ltd., London, AN 86–297427 & SU, A, 1219038, abstract, Mar. 23, 1986.

Database WPI, Week 8743, Derwent Publications Ltd., London, AN 87–301347 & HU, A, 42925, abstract, Sep. 28, 1987.

Patent Abstracts of Japan, vol. 13, No. 336 (C–623), Jul. 27, 1989.

Patent Abstracts of Japan, vol. 9, No. 096 (C–278), Apr. 25, 1985.

*Primary Examiner*—Carolyn Paden
*Attorney, Agent, or Firm*—Jacobson, Price, Holman & Stern, PLLC

[57] ABSTRACT

A process is provided for producing a chocolate composition reduced in fat and calories, which either contains sugar or is free of added sugar, and which has the taste and mouthfeel of traditional chocolate. The process involves developing the chocolate flavour during a normal chocolate-making procedure up to and including conching, and then removing some of the fat, e.g. by means of a cocoa liquor press.

16 Claims, No Drawings

PROCESS FOR MANUFACTURE OF REDUCED FAT AND REDUCED CALORIE CHOCOLATE

FIELD OF THE INVENTION

This invention relates to a process for the manufacture of reduced fat and reduced calorie chocolate.

BACKGROUND OF THE INVENTION

Chocolate is a food with high fat and high energy content, with a total fat content (including emulsifiers) of up to 45% by weight. A typical milk chocolate for example may contain 31% fat, 7% protein and 56% carbohydrate with an energy value of 531 kcal/100 g. Fat provides about 53% of this energy. Internationally accepted nutritional guidelines propose that fat should provide no more than 30% to 35% energy. In countries where overweight and obesity are common, the total energy content of the diet should be reduced. There are thus cogent arguments for reducing both the fat and energy contents of chocolate.

In theory, reduction in the fat content of chocolate can be simply achieved by reducing the amount of fat ingredients; such as cocoa butter or milk fat, or of fat-containing ingredients; such as cocoa liquor, milk powder or hazelnut. There are however legal and technical restraints on fat reduction in chocolate. Legally, chocolate needs to contain a minimum of 25% fat. Although this limit would not apply to "imitation chocolate", it is a barrier to fat and calorie reduction in true chocolate. For example, a reduction from 31% to 25% fat with replacement by carbohydrate would give an energy reduction of only 30 kcal/100 g. Technical problems arise owing to the increase of viscosity of the chocolate mass as the fat content is reduced. This leads to conching of chocolate being more difficult and less effective, resulting in less flavour development. Additionally the reduction in fat available to coat the ingredients, notably sugar, leads to chocolate of inferior mouthfeel.

A radical solution to the issue of fat content in chocolate is the substitution of cocoa butter by partially or wholly non-metabolisable fats. This is disclosed, for example, in EP-A-0285187, EP-A-0285187 and EP-A-0495553. There are two major disadvantages in using non-metabolisable fats in chocolate; the formulations do not conform to legal standards for chocolate and these "fats" may cause anal leakage, of which the latter effect is likely to limit acceptability by consumers.

Concerning the more general proposition of reducing the calorie content of chocolate, the most successful approach involves replacement of sucrose by partially metabolisable carbohydrates. There are many specific disclosures including EP-A-0317917 and EP-A-0512910 involving this approach. Sugar replacers fall into two categories, polyols and bulking agents. Polyols, sometimes called sugar alcohols, are essentially hydrogenated sugars exemplified by sorbitol, isomalt, maltitol, lactitol, erythritol and xylitol, amongst others. Bulking agents consist of polymers of readily metabolised sugars like glucose and fructose linked by bonds which cannot be split by the enzymes of the digestive system. Examples of bulking agents are polydextrose, oligofructose and inulin. Both polyols and bulking agents are partially metabolised by intestinal flora and so provide some energy. Most polvols are accorded an energy value of 2.4 kcal/g, polydextrose 1.0 kcal/g, and the energy value of other bulking agents has yet to be agreed. These energy figures compare with 4 kcal/g for sucrose, so that when 45 g sucrose is replaced by polyol, the energy reduction in chocolate is 72 kcal/100 g, whilst when such an amount of sucrose is replaced by 22.5 g each of polyol and polydextrose, the energy reduction is 103.5 kcal/100 g. Technically, both polyols and bulking agents increase the viscosity of the chocolate mass compared with sucrose. Thus, high fat levels in such chocolates need to be maintained in order to decrease viscosity, while the temperature of conching has to be lowered, leading to less effective flavour development. The retention of high fat levels limits calorie reduction and makes unrealistic the 25% to 30% reduction in calories demanded by some regulators to classify a food as "reduced calorie".

Other food ingredients that are not metabolised and which are of zero calorific value (such as dietary fibre, for example cellulose, particularly methyl cellulose, pectins, edible gums, cereal fibres and vegetable fibers), can be introduced into the initial recipe mix in amounts up to about 7.5% by weight, preferably less than 5%. The present invention is also applicable to such mixes.

The need is for a process suitable for regular and low calorie chocolate allowing product to be made with 25% fat or less, yet which allows good flavour development during conching. The present invention does this by making a full fat, full flavour chocolate and then subsequently reducing the fat content.

SUMMARY OF THE INVENTION

Thus, according to the present invention, there is provided a process for the manufacture of reduced fat and calorie chocolate, wherein chocolate flavour is developed, preferably by conching, in a chocolate composition having a fat content which is higher than that required in the reduced fat chocolate to be manufactured, and thereafter some of the fat is removed to reduce the fat content to the desired level.

The fat removal step will normally be effected after a conching step (e.g. using a roller conche, a rotary conche, a double beating conche or a continuous conche) which is the traditional step employed to develop the flavour in high quality chocolate. However, it is within the scope of the present invention to perform the fat removal step after any other chocolate processing step which replaces the conching step for developing flavour, such as a mixing or kneading step where the ingredients of the chocolate composition are thoroughly mixed or kneaded together.

DETAILED DESCRIPTION OF THE INVENTION

Partial defatting of cocoa liquor is well known and described in detail among others by Minifie, B. W. in "Chocolate, Cocoa and Confectionery", 3rd edition 1989, published by Van Nostrand Reinhold. Typically, the process involves pressing the liquor at temperatures of 95°–110° C. at up to 1000 bar. Minifie (page 71) specifically warns against the presence of fine particles in cocoa liquors stating they "are almost certain to cause pressing troubles, with build-up of back pressure and blinding of sieves". Chocolate, unlike cocoa liquor, contains a large amount of fine sugar particles and moreover cannot be processed at high temperatures because its viscosity increases uncontrollably. There would thus seem scant prospect of using pressing to reduce fat content of chocolate. It was very surprising therefore that it proved possible to reduce the total fat content of chocolate to as low as about 7% by weight using the presses normally used for pressing cocoa liquor. However, the temperature of the chocolate for pressing needs to be lower than that for cocoa liquor to avoid the creation of undesirable flavour characteristics.

The process can be employed to effect partial removal of the fat from conventionally manufactured white, plain or milk chocolate, or it can be employed in the manufacture of low calorie chocolate in which sugar has been replaced by polyol(s) and/or bulking agent(s), e.g. of the type mentioned hereinabove. Thus, the process involves starting with chocolate-making ingredients comprising cocoa butter, non-fat cocoa solids (in the case of plain or milk chocolate), milk solids (in the case of milk or white chocolate), and sugar (which may be at least partially replaced by polyol(s) and/or bulking agent(s) in the case of low calorie chocolate). In some cases, cocoa butter substitutes or replacement fats may be used in the place of at least a proportion of the cocoa butter. An emulsifier (e.g. lecithin) will also normally be included in an minor amount (typically about 0.5% by weight of the total chocolate composition), the amount used being included in the specified total fat content of the chocolate composition. Such chocolate-making ingredients may then be processed in a conventional manner for chocolate-making, e.g. by mixing or kneading, then refining and conching. Some of the cocoa butter (and emulsifier when used) may be added during the conching stage to promote the required flavour development.

The total fat content required at the conching stage varies depending upon the nature of the other chocolate-making ingredients, but it is generally considered that a total fat content of the chocolate of at least 25% by weight is required. However, at the conching stage, the total fat content is generally not less than about 29% by weight. To ensure adequate conching, even higher total fat contents may be required when polyol(s) and bulking agents are employed. Generally speaking, the total fat content of the chocolate during conching is in the range of 25 to about 45% by weight.

Following conching or other flavour development step effected on the chocolate composition, it is then partially de-fatted in accordance with the present invention. De-fatting may be effected so that the resultant chocolate composition has a total fat content corresponding to that required in the final chocolate composition, e.g. as low as 18 to 25% by weight, or perhaps even as high as 30% by weight. Under current legislation, the chocolate composition should not contain less than 25% by weight of total fat if the product is to be sold as chocolate. However, it is also within the scope of the present invention to reduce the total fat content in the de-fatting step down to a lower level (e.g. down to as low as 7 to 10% by weight) than that required in the final chocolate composition and then to add additional fat (reduced calorie or otherwise) to raise the fat content to the finally required level. This has the advantage that, since the additional fat is not intimately bound onto the surfaces of the solid particles in the chocolate composition, it can impart improved fluidity as compared with a chocolate composition which has simply been de-fatted to the same total fat content.

In a preferred embodiment, chocolate as described heretofore is heated with stirring to 25° C. to 90° C., preferably in the range of 40° C. to 65° C. for milk and white chocolate and up to 90° C. for plain chocolate, and pumped to a press, preferably a horizontal cocoa press. In the press, a pressure of 10 to 1000 bar, preferably 400 to 1000 bar, is applied to express fat until chocolate with the desired fat content remains.

Alternatively, the fat reduction of the chocolate may be effected by solvent extraction using a suitable solvent, e.g. carbon dioxide. Such extraction may be effected on the chocolate when in powder form under high pressure using either liquid or supercritical carbon dioxide. The use of liquid carbon dioxide may be preferred because of its weaker solvation power and its greater selectivity. Preferably, solvent extraction using liquid carbon dioxide is effected at about 10° C. under a pressure of about 300 bar. The extracted fat contains a large amount of the chocolate flavouring and can be re-cycled or used to avoid wastage. An alternative solvent extraction medium is an organic solvent, e.g. petroleum ether. However, care should be taken to ensure that the resultant chocolate composition contains no organic solvent residues.

A further technique for fat removal may be by centrifugation of the heated liquid chocolate.

It will be appreciated from the above that the fat-removal step in the present invention can be employed to reduce the total fat content down to as low as 7% by weight. However, the desired fat level as a result of the fat-removal step can be selected according to requirements and may be variously be not more than 30%, not more than 25%, not more than 20% or not more than 15%.

In some instances, the fat removed during the fat removal step is found suitable for direct re-use in subsequent batches of chocolate because the amount of non-fat solids is small. Since the removed fat will usually contain other chocolate ingredients and has a pleasant chocolate flavour, it also is possible to use it as a chocolate flavour-imparting or enhancing ingredient in other recipes where a chocolate flavour and a fat are required. As an alternative, the fat phase can be separated from the non-fat phase, e.g. by either filtration or centrifugation, before re-use.

After the fat-removal step, the resultant solid material (eg press cake in the case where the fat removal has been effected by pressing) can then be broken up and nibbled to small pieces of about 10 mm diameter which are then further size reduced, eg by means of a hammer mill, turbine mill, pin mill or air classifier mill. During this size reduction, a cryogenic system as well as cooling air may be required for turbine or pin mills when the chocolate being milled has a total fat content of more than 12% by weight. A separate air classifier is preferably used after turbine or pin milling to remove fine particles of less than 10 $\mu$m, preferably less than 5 $\mu$m. A second air classifier is preferably used to remove particles having a size of greater than 80 $\mu$m. For an air classifier, it is generally necessary to use cooled process air (typically at 0° C.) in the case where the chocolate composition contains more than 15% total fat. A roll refiner can be used for chocolate having a total fat content of more than about 18.5% by weight.

The milled particles preferably comprise particles in the size range of 5 $\mu$m to 80 $\mu$m or 10 $\mu$m to 80 $\mu$m, although they will normally be in the lower end of this range, typically substantially less than 40 $\mu$m as measured by a micrometer.

The solid, fat-reduced chocolate, preferably in the form of a fine powder produced as described by any of the above techniques, is then preferably heated and stirred to form a paste. Mixing to form a paste may be effected in any suitable mixer, eg a jacketed Hobart mixer at for example 40° C., typically for up to 4 hours. One or more emulsifiers are most preferably added to assist in paste formation. For example, up to 0.85% by weight (based on the total chocolate composition) of ammonium phosphatide and up to 0.5% by weight (based on the total chocolate composition) of polyglycerol polyricinoleate (PGPR). Such emulsifier(s) is/are in addition to any originally added emulsifier (eg lecithin) which may be present in the fat-reduced chocolate composition. The amount(s) of any such additional emulsifier(s)

are included in the quoted total fat content of the resultant chocolate. In the case where the chocolate has been reduced to a lower total fat content than that required, it may be milled and reconstituted to the final product composition with addition of fat.

The fat-reduced chocolate paste may then tempered in the conventional way before shaping it (e.g. by moulding, cooling and de-moulding) to the required solid physical form. Heated chocolate masses (at temperatures above the melting point of the fats within the mass) and with a reduced fat content are more viscous than the equivalent chocolate masses prior to fat removal.

In the final chocolate composition, the total fat content (inclusive of any emulsifiers) may typically be in the range of 18 to 30% by weight, and is preferably 18 to 25% by weight. Chocolate having total fat content of 18 to 25%, preferably about 20%, may be formed to shape by extrusion, whilst chocolate having total fat content of 20 to 25%, preferably about 21.5%, may be moulded to shape or formed into flakes, vermicelli or roller deposited into drops. Chocolate having a consistency which resembles more a thick paste rather than a viscous liquid can be difficult to mould and demould. For this reason, the more viscous masses are preferably shaped using an extruder, e.g. a twin extruder, so that the required cross-sectional shape is imparted by the forming nozzle of the extruder.

The density of the chocolate can be reduced by a gas injection step in the extruder. Typically, gas is injected into the extruder so that gas bubbles of the required size are homogeneously mixed into the chocolate mass. Any food compatible gas may be used, e.g. carbon dioxide, nitrogen or air, or mixtures thereof under a pressure of 1.5 bar to 100 bar, preferably 1.5 to 10 bar. Alternatively, liquefied carbon dioxide at a pressure of 6 to 100 bar may be used at a temperature of minus 50° C. to +30.5° C., preferably 10° C. to 30.5° C. The pressure of gas injection may be accurately controlled by regulating the pressure of the gas being fed into the extruder, by regulating the aperture on the die head so as to control the back pressure in the extruder or by selecting the screw profile or configuration (at a point on the extruder barrel before the injection inlet) to inhibit back flow of gas towards the inlet of the extruder.

Whether or not gas injection takes place in the extruder, the temperature of the chocolate in the extruder is maintained at 24° C. to about 80° C. In general, for tempered chocolate, the chocolate in the extruder should be maintained at 24° to 30.5° C. For non-tempered chocolate or chocolates containing cocoa butter replacement or substitute fats, the upper temperature limit of 30.5° C. is not critical and temperatures above 35° C. are preferred.

Viscous chocolate masses are also extremely difficult to temper and, for this reason, vegetable fat substitutes can be used to replace at least some of the cocoa butter, and thus avoid the necessity to temper the chocolate mass.

If textural changes are desired, the chocolate may be made less dense by injection of inert gas under pressure into the liquid chocolate, tempering under pressure and depositing into moulds at atmospheric pressure.

Alternative ways of processing the fat-reduced chocolate to produce the final product may be as follows:

(a) A conventional rotary tabletting machine is used to produce tablets. In this case, the chocolate which has been powdered to the required particle size should preferably be aggregated prior to feeding into the tabletting machine in order to achieve the required tablet density. Tablets may be produced in different shapes and embossed if required. Such tablets may be coated with a food grade lacquer to impart an improved surface appearance.

(b) The chocolate may be formed into briquettes using drop rollers and, as in the tabletting technique described above, may be coated with a suitable lacquer to give an acceptable surface finish. The briquettes can be manufactured in a variety of shapes and sizes and may be presented as bagged confectionery.

(c) The fat-reduced chocolate may be formed into low-fat flake prepared by passing the fat-reduced chocolate formed into a paste over a cooled roller and scraping the resultant material off the roller with a knife and compacting to form the product.

(d) The fat-reduced chocolate may be pasted in an extruder and formed through a die plate into rope which can then be cut to the desired length. Tempering of the chocolate may advantageously take place in the extruder. The product in the extruder may be expanded to produce a foamed product using a suitable foaming agent, e.g., high pressure carbon dioxide.

(e) The fat-reduced chocolate may be extruded down the center of cooled caramel tube to produce chocolate eclairs.

Examples of the invention will now be described. They in no way limit the scope of the invention.

TABLE 1

Starting Formulations of Chocolate

| Ingredient | Regular Milk Chocolate % by wt | Low Calorie Milk Chocolate % by wt |
|---|---|---|
| Sugar | 45.0 | — |
| Lactitol | — | 45.0 |
| Cocoa liquor | 13.0 | 12.0 |
| Cocoa butter | 17.0 | 17.0 |
| Wholemilk powder | 19.0 | 19.0 |
| Skimmilk powder | 3.49 | 3.0 |
| Hazelnut paste | 2.0 | 2.0 |
| Milk fat | — | 1.35 |
| Lecithin | 0.5 | 0.5 |
| Aspartame | — | 0.14 |
| Vanillin | 0.01 | 0.01 |
| Total Fat content (approx) | 30.9 | 31.6 |
| Energy (approx) kcal/100 g | 532 | 463 |
| Energy at 25% fat (approx) kcal/100 g | 501 | 421 |

EXAMPLE 1

The ingredients for regular milk chocolate given in Table 1 above are weighed to provide a 210 kg batch. Cocoa liquor, wholemilk powder, sugar, skimmilk powder, hazelnut paste and vanillin are added to a melangeur followed by 32 kg cocoa butter and mixed until homogeneous. It is then passed through a five roll refiner to reduce the average particle size to about 25 $\mu$m. This refined mass is then conched for 7 hours at 80° C., the remaining cocoa butter and the lecithin are added and conching is continued for a further 2 hours at 80° C.

The conched chocolate is pumped to a heated tank and stirred while heating at 80° C. From this tank it is pumped to the pots of a horizontal cocoa liquor press and the filling valves are closed. A pressure of 620 bar is applied until 16.5 kg fat has been expelled. The resultant fat-reduced chocolate is transferred to a tank where it is stirred and tempered. It is then poured into 100 g bar moulds, cooled and demoulded.

EXAMPLE 2

Example 1 is repeated except pressing is effected to reduce the total fat content to 21.0% by weight and the resultant pressed chocolate cakes are broken up and nibbled to small pieces of less than 10 mm diameter and then milled to a fine powder (30 μm micrometer particle size) in a cryogenic mill. The resultant powder is then transferred to a Hobart mixer at 40° C. where it is stirred for 4 hours into a paste after adding 0.85% by weight of ammonium phosphatide and 0.5% by weight of polyglycerol polyricinoleate (PGPR) as emulsifiers, such amounts being based on the total weight of the chocolate composition being pasted. The resultant paste is then tempered using a Rasch tempering machine and then transferred into 20–100 g bar moulds, cooled and de-moulded. Some of the chocolate paste is mixed variously with up to 15% puffed rice, 15% corn crispies or pieces of partially defatted peanuts prior to moulding.

EXAMPLE 3

The ingredients for low calorie milk chocolate given in Table 1 above are weighed to provide a 210 kg batch. Cocoa liquor, wholemilk powder, lactitol, skimmilk powder, hazelnut paste and vanillin are added to a melangeur followed by 32 kg cocoa butter and mixed until homogeneous. It is passed through a five roll refiner to reduce the average particle size to about 25 μm. This refined mass is then conched for 15 hours at 60° C. and aspartame, lecithin and the remaining cocoa butter added and mixed thoroughly. As an alternative, one or more intense sweeteners, e.g. one or more of sucralose, alitame, acetosulfame K, saccharin and cyclamate can be added instead of aspartame in an amount depending upon the sweetness level desired in the finished chocolate.

The conched chocolate is heated to 60° C. and pumped to a heated tank where it is stirred at 60° C. It is then pumped to a horizontal cocoa liquor press and the filling valves are closed. A pressure of 620 bar is applied until 18.5 kg of fat has been expelled. The resultant fat-reduced chocolate is transferred to a tank, stirred and tempered. It is then poured into 100 g bar moulds, cooled and demoulded.

EXAMPLE 4

Example 3 is repeated up to the pressing stage during which the total fat content is reduced to 21.5% by weight, following which the procedure described in Example 2 is employed.

EXAMPLE 5

Example 1 is repeated except that the chocolate is pressed for a longer period until 28.6 kg of the fat has been expelled (giving a total 20% fat content in the residual chocolate mass). The resultant press cakes are broken up and nibbled to small pieces of less than 10 mm diameter and then milled to a fine powder (30 μm micrometer particle size). The powder is transferred to a heated tank at 40° C. and the mixture is stirred for 4 hours to form a paste after adding 0.85% by weight of ammonium phosphatide and 0.5% by weight of polyglycerol polyricinoleate (PGPR) as emulsifiers, such amounts being based on the total weight of the chocolate composition being pasted. The paste is then tempered.

The tempered chocolate paste is then passed through a Clextral BS 45 twin extruder at an elevated temperature of 24°–30.5° C., subjected to shear and mechanical pressure, at a screw speed of between 80–120 rpm and extruded from the extruder through the forming nozzle. The extruded chocolate, in this example in rope form, is allowed to cool and cut at set lengths.

EXAMPLE 6

Regular milk chocolate is prepared as described in Example 1 and then pressed for a prolonged time so as to reduce the total fat content to 10% by weight. The resultant pressed cake is broken up and nibbled to small pieces of less than 10 mm diameter and then milled to a fine powder (30 μm micrometer particle size). The powder is transferred to a heated tank at 40° C. and cocoa butter plus 0.85% by weight of ammonium phosphatide and 0.5% by weight of polyglycerol polyricinoleate (PGPR) as emulsifiers (such amounts being based on the total weight of the chocolate composition being pasted) are added to bring the total fat content of the mixture to 21.5% by weight and the mixture is stirred for 4 hours to form a paste. The paste is then transferred into bar moulds, cooled and de-moulded.

EXAMPLE 7

Example 6 is repeated except that Caprenin, as a typical example of a reduced calorie fat, is added as a low calorie fat in the place of the added cocoa butter to bring the total fat content to 21.5% by weight.

EXAMPLE 8

The ingredients for the low calorie milk chocolate in Table 1 above are weighed to provide a 210 kg batch. However, in this particular recipe, 50% of the lactitol is replaced by polydextrose. Cocoa liquor, wholemilk powder, lactitol, polydextrose, skimmilk, hazelnut paste and vanillin are added to a melangeur followed by 32 kg cocoa butter and mixed until homogeneous. It is passed through a five roll refiner to reduce the average particle size to about 25 μm. This refined mass is then conched for 15 hours at 60° C. and aspartame, lecithin and the remaining cocoa butter are added and mixed thoroughly.

The conched chocolate is pumped to a heated tank and pressed as described in Example 1. The chocolate mass is pressed for a longer period until 23 kg of the fat has been expelled.

The reduced fat mass is then tempered and passed through a twin screw extruder as described in Example 5.

EXAMPLE 9

Lower calorie milk chocolate (which contained a carbohydrate substitute) is prepared and pressed as described in Example 4, except that anhydrous maltitol is used in place of the lactitol and that pressing is prolonged so as to reduce the total fat content to 10% by weight. One or more other intense sweeteners can be used in the place of aspartame, as described in Example 3.

The resultant pressed cakes are broken up and nibbled to small pieces of less than 10 mm diameter and then milled to a fine powder (30 μm micrometer particle size). The powder is transferred to a heated tank at 40° C. and Caprenin, as a typical example of a reduced calorie fat, plus 0.85% by weight of ammonium phosphatide and 0.5% by weight of polyglycerol polyricinoleate (PGPR) as emulsifiers (such amounts being based on the total weight of the chocolate composition being pasted), are added to bring the total fat content of the mixture to 21.5% by weight and the mixture is stirred for 4 hours to form a paste. The paste is then transferred into bar moulds, cooled and de-moulded.

EXAMPLE 10

Example 2 is repeated except that the milling step is omitted and pasting is effected directly on the broken up and nibbled pressed cake.

EXAMPLE 11

Example 4 is repeated except that the milling step is omitted and pasting is effected directly on the broken up and nibbled pressed cake.

EXAMPLE 12

Example 8 is repeated up to the conching stage with the exception that 50% of the lactitol is replaced by a polydextrose and fine particle methyl cellulose (10:1 ratio). After conching, the chocolate is processed as described in Example 2.

EXAMPLE 13

Example 12 is repeated except that the conched chocolate is pressed to a total fat content of 10% by weight and then made up to 21.5% by weight by addition of Caprenin, as a typical example of a reduced calorie fat, as described in Example 7.

EXAMPLE 14

A reduced fat chocolate paste is produced as described in Example 6 and is then fed into the flaking rolls of a flaking machine where it partially solidifies to be transferred by the scraper of the machine to a tunnel cooler where it is set solid in a crinkled form which is called "flaked chocolate".

I claim:

1. A process for the manufacture of a reduced fat and reduced calorie final chocolate product comprising the steps of
   (i) mixing together chocolate making ingredients including at least one cocoa ingredient selected from the group consisting of cocoa liquor, cocoa butter, cocoa butter substitutes and non-fat cocoa solids, and at least one sweetener selected from the group of sugar and other sweeteners so as to produce a chocolate composition having a fat content which is higher than that required in the reduced fat chocolate to be manufactured,
   (ii) subjecting said chocolate composition to a flavour development step by conching, and
   (iii) after said conching step, processing said chocolate composition to remove some of the fat from said chocolate composition to reduce the fat content to a level in the range of 7 to 30% by weight in said final chocolate product.

2. A process as claimed in claim 1, wherein fat removal is effected by means of a press.

3. A process as claimed in claim 2, wherein the chocolate composition is at a temperature of 25° C. to 90° C. during pressing.

4. A process as claimed in claim 3, wherein the chocolate composition is a milk or a white chocolate and is at a temperature of 40° C. to 65° C. during pressing.

5. A process as claimed in claim 3, wherein the chocolate composition is a plain chocolate.

6. A process as claimed in claim 2, wherein pressing is effected at a pressure of 10 to 1000 bar.

7. A process as claimed in any one of claim 2, wherein the press is a cocoa liquor press.

8. A process as claimed in claim 1, wherein after the fat-removal step, the chocolate composition is size reduced before further processing.

9. A process as claimed in claim 8, wherein further processing includes forming the size-reduced chocolate composition into a paste, and then shaping it.

10. A process as claimed in claim 1, wherein the reduced fat chocolate composition is shaped by extrusion.

11. A process as claimed in claim 1, wherein the reduced fat chocolate composition is shaped by forming it into flakes, vermicelli or drops.

12. A process as claimed in claim 1, wherein the density of said reduced fat chocolate composition is reduced by injection of a gas.

13. A process as claimed in claim 1, wherein the chocolate composition is an untempered chocolate composition in which at least part of the cocoa butter has been replaced by one or more other vegetable fats.

14. A process as claimed in claim 1, wherein the removed fat of step (iii) is re-cycled for use in the process or is used in another manufacturing process.

15. A process as claimed in claim 1, wherein the chocolate making ingredients include at least one further ingredient selected from the group consisting of emulsifiers and milk solids.

16. A process as claimed in claim 1, further comprising refining said chocolate composition prior to said flavour development step to reduce particle size of the chocolate making ingredients.

* * * * *